United States Patent
Caudill

(10) Patent No.: US 8,933,817 B2
(45) Date of Patent: Jan. 13, 2015

(54) EMERGENCY VEHICLE TRAFFIC DIRECTIONAL LIGHTS

(76) Inventor: Bobby Caudill, Lexington, KY (US)

(*) Notice: Subject to any disclaimer, the term of this patent is extended or adjusted under 35 U.S.C. 154(b) by 497 days.

(21) Appl. No.: 12/807,449

(22) Filed: Sep. 7, 2010

(65) Prior Publication Data

US 2012/0056757 A1 Mar. 8, 2012

(51) Int. Cl.
*G08G 1/095* (2006.01)
*B60Q 7/00* (2006.01)
*B60Q 1/52* (2006.01)

(52) U.S. Cl.
CPC ... *B60Q 7/00* (2013.01); *B60Q 1/52* (2013.01)
USPC ............ 340/908; 340/472; 340/471; 362/542

(58) Field of Classification Search
USPC ......... 340/908, 468, 471–473, 479, 464–464, 340/487; 116/63, 35 R, 202; 362/540, 542, 362/543, 544, 545, 549
See application file for complete search history.

(56) References Cited

U.S. PATENT DOCUMENTS

| | | | |
|---|---|---|---|
| 3,761,890 A | 9/1973 | Britts et al. | |
| 4,835,515 A * | 5/1989 | McDermott et al. | 340/472 |
| 4,928,084 A | 5/1990 | Reiser | |
| 5,097,397 A | 3/1992 | Stanuch et al. | |
| 5,905,434 A | 5/1999 | Steffan et al. | |
| 6,081,191 A | 6/2000 | Green et al. | |
| 6,300,870 B1 | 10/2001 | Nelson | |
| 6,424,269 B1 | 7/2002 | Pederson | |
| 6,682,210 B1 * | 1/2004 | Ford et al. | 362/493 |
| 6,707,389 B2 | 3/2004 | Pederson | |
| 6,789,930 B2 * | 9/2004 | Pederson | 362/545 |
| 7,378,948 B2 | 5/2008 | Somuah | |
| 7,388,514 B1 * | 6/2008 | McDow | 340/907 |
| 7,477,140 B1 | 1/2009 | Booth et al. | |
| 7,561,036 B2 | 7/2009 | Pederson | |
| 7,659,808 B1 | 2/2010 | Cooper et al. | |
| 2002/0036908 A1 * | 3/2002 | Pederson | 362/545 |
| 2005/0072350 A1 * | 4/2005 | Aasgaard | 116/259 |
| 2008/0080203 A1 * | 4/2008 | Neufeglise | 362/540 |
| 2009/0256697 A1 | 10/2009 | Tallinger | |
| 2010/0073948 A1 | 3/2010 | Stein et al. | |

* cited by examiner

*Primary Examiner* — Brian Zimmerman
*Assistant Examiner* — Laura Nguyen
(74) *Attorney, Agent, or Firm* — Carrithers Law Office, PLLC

(57) ABSTRACT

A removable vehicle directional light unit for use on a police or emergency vehicle which will be highly visible from a long distance for directing traffic to one or more specified lanes to reduce congestion and avoid accidents, particularly accidents involving police and emergency vehicles parked in the vicinity. The device is removably installed onto the rear window, mounted on the rear deck, or mounted on the trunk or top of the vehicle when in use and has a plurality of highly visible flashing lights configured in the shape of an arrow pointing in the direction leading away from a traffic blockage. The vehicle directional light unit includes a control box with a selector switch and flasher units to cause light groupings to flash in a selected pattern indicating the intended lane or lanes which approaching traffic should use.

4 Claims, 5 Drawing Sheets

Causes of Law Enforcement Deaths (1997 - 2006)

| CAUSE OF DEATH | 2006 | 2005 | 2004 | 2003 | 2002 | 2001 | 2000 | 1999 | 1998 | 1997 | TOTAL |
|---|---|---|---|---|---|---|---|---|---|---|---|
| Aircraft Accidents | 3 | 2 | 3 | 1 | 7 | 5 | 7 | 4 | 4 | 5 | 41 |
| Auto Accidents | 45 | 42 | 51 | 52 | 44 | 42 | 50 | 51 | 55 | 47 | 479 |
| Beating | 1 | 0 | 0 | 2 | 2 | 2 | 2 | 1 | 1 | 0 | 11 |
| Bicycle Accident | 2 | 0 | 0 | 0 | 0 | 0 | 2 | 0 | 0 | 0 | 4 |
| Boating Accident | 0 | 0 | 0 | 0 | 0 | 2 | 0 | 0 | 1 | 0 | 3 |
| Bomb-Related Incident | 0 | 1 | 3 | 0 | 1 | 0 | 1 | 0 | 1 | 1 | 8 |
| Drowning | 0 | 4 | 3 | 4 | 3 | 1 | 3 | 0 | 7 | 0 | 25 |
| Electrocuted | 0 | 0 | 1 | 1 | 0 | 0 | 0 | 0 | 0 | 0 | 2 |
| Fall | 0 | 4 | 1 | 2 | 0 | 2 | 3 | 3 | 1 | 6 | 22 |
| Horse-Related Accident | 0 | 0 | 0 | 0 | 1 | 0 | 2 | 0 | 0 | 0 | 3 |
| Job-Related Illness | 14 | 20 | 16 | 7 | 12 | 8 | 8 | 18 | 14 | 16 | 133 |
| Motorcycle Accident | 11 | 5 | 10 | 11 | 7 | 8 | 10 | 7 | 4 | 5 | 78 |
| Poisoned | 0 | 0 | 0 | 1 | 1 | 0 | 0 | 0 | 0 | 0 | 2 |
| Shot | 52 | 59 | 59 | 50 | 60 | 72 | 53 | 46 | 63 | 68 | 582 |
| Stabbing | 1 | 1 | 1 | 1 | 2 | 0 | 2 | 2 | 0 | 5 | 15 |
| Strangled | 0 | 0 | 0 | 1 | 0 | 0 | 0 | 0 | 0 | 1 | 2 |
| Struck by Falling Object | 0 | 2 | 1 | 0 | 1 | 1 | 2 | 0 | 1 | 0 | 8 |
| Struck by Train | 0 | 1 | 0 | 1 | 2 | 0 | 0 | 1 | 1 | 1 | 7 |
| Struck by Vehicle | 15 | 16 | 13 | 13 | 14 | 24 | 16 | 10 | 15 | 15 | 151 |
| Terrorist Attack | 1 | 0 | 0 | 0 | 0 | 72 | 0 | 0 | 0 | 0 | 73 |
| Total | 145 | 157 | 162 | 147 | 157 | 239 | 161 | 143 | 168 | 170 | 1649 |
| Updated 11/16/07 | | | | | | | | | | | |

FIG. 7

Causes of Law Enforcement Deaths
Over the Past Decade (2000-2009)

| CAUSE OF DEATH | 2009 | 2008 | 2007 | 2006 | 2005 | 2004 | 2003 | 2002 | 2001 | 2000 | TOTAL |
|---|---|---|---|---|---|---|---|---|---|---|---|
| Aircraft Accidents | 4 | 3 | 3 | 3 | 2 | 3 | 1 | 7 | 5 | 7 | 38 |
| Auto Accidents | 38 | 44 | 60 | 45 | 43 | 51 | 52 | 44 | 42 | 50 | 469 |
| Beaten | 0 | 1 | 0 | 1 | 0 | 0 | 2 | 2 | 2 | 2 | 10 |
| Bicycle Accident | 0 | 0 | 0 | 2 | 0 | 0 | 0 | 0 | 0 | 2 | 4 |
| Boating Accident | 0 | 0 | 1 | 0 | 0 | 0 | 0 | 0 | 2 | 0 | 3 |
| Bomb-Related Incident | 0 | 2 | 0 | 0 | 1 | 3 | 0 | 1 | 0 | 1 | 8 |
| Drowning | 0 | 1 | 4 | 0 | 4 | 3 | 4 | 3 | 1 | 3 | 23 |
| Electrocuted | 0 | 1 | 0 | 0 | 0 | 1 | 1 | 0 | 0 | 0 | 3 |
| Fall | 0 | 0 | 3 | 0 | 4 | 1 | 2 | 0 | 2 | 3 | 15 |
| Horse-Related Accident | 0 | 0 | 0 | 0 | 0 | 0 | 0 | 1 | 0 | 2 | 3 |
| Job-Related Illness | 12 | 17 | 16 | 20 | 23 | 18 | 8 | 12 | 9 | 9 | 144 |
| Motorcycle Accident | 3 | 9 | 10 | 11 | 5 | 10 | 11 | 7 | 8 | 10 | 84 |
| Poisoned | 0 | 0 | 0 | 0 | 0 | 0 | 1 | 1 | 0 | 0 | 2 |
| Shot | 49 | 40 | 68 | 54 | 60 | 59 | 50 | 60 | 72 | 53 | 565 |
| Stabbed | 0 | 1 | 0 | 1 | 1 | 1 | 1 | 2 | 0 | 2 | 9 |
| Strangled | 0 | 0 | 0 | 0 | 0 | 0 | 1 | 0 | 0 | 0 | 1 |
| Struck by Falling Object | 0 | 0 | 1 | 0 | 2 | 1 | 0 | 1 | 1 | 2 | 8 |
| Struck by Train | 0 | 1 | 0 | 0 | 1 | 0 | 1 | 2 | 0 | 0 | 5 |
| Struck by Vehicle | 10 | 18 | 14 | 16 | 16 | 13 | 13 | 14 | 24 | 16 | 154 |
| Terrorist Attack | 0 | 0 | 5 | 1 | 0 | 0 | 0 | 0 | 72 | 0 | 78 |
| Total | 116 | 138 | 185 | 154 | 162 | 164 | 148 | 157 | 240 | 162 | 1626 |

*Updated April 2010*

| ADDITIONAL DATA | 2009 | 2008 | 2007 | 2006 | 2005 | 2004 | 2003 | 2002 | 2001 | 2000 |
|---|---|---|---|---|---|---|---|---|---|---|
| Female Officers Killed | 1 | 13 | 6 | 7 | 5 | 9 | 6 | 15 | 12 | 7 |
| Alcohol-Related Deaths | 9 | 13 | 25 | 17 | 14 | 26 | 14 | 13 | 24 | 12 |
| Drug-Related Deaths | 5 | 8 | 21 | 12 | 10 | 15 | 13 | 2 | 11 | 7 |
| Officers Killed Wearing Body Armor | 68% | 64% | 73% | 66% | 56% | 53% | 74% | 62% | 35% | 62% |

*Updated April 2010*

FIG. 8

EMERGENCY VEHICLE TRAFFIC DIRECTIONAL LIGHTS

TECHNICAL FIELD

The present invention relates to the field of traffic warning lights used on emergency or utility vehicles and in particular to lights which direct traffic approaching a traffic stoppage to preferred lanes of travel.

BACKGROUND OF THE INVENTION

When an unscheduled accident, road work, or other problem occurs requiring the blockage of one or more traffic lanes on a highway, traffic jams occur and drivers are frustrated because they can't see the problem and do not know how to avoid the delay and whether they should switch lanes to ease congestion of the traffic. Especially where hills or curvy roads block the view of approaching traffic or in inclement weather, drivers' vision is blocked so that they can select an appropriate lane. Signal lights like those used on emergency, utility or service vehicles such as police cars, fire trucks, ambulances, wreckers, electrical or mechanical service vehicles have improved from simple dome lights to light bars producing a variety of signals. Police cars, emergency and utility vehicles have emergency lights but these lights don't indicate what lane or lanes to avoid. Scenes of accidents, situations where help is being provided to a motorist or where a motorist is pulled over on the shoulder for a violational create traffic backups and hazardous situations for any personnel around such a scene.

Further, many injuries and fatalities occur at emergency scenes where emergency personnel, police or bystanders are struck by moving traffic because driver's are not aware of areas to avoid or to take special care. According to the National Law Enforcement Officers Memorial Fund—Facts and Figures from www.nleomf.com, an average of 15 law enforcement officers per year were struck and killed by vehicles over the years from 1997 to 2006 as shown in the chart set forth in FIG. 7 and from 2000 to 2009 as shown in the chart set forth in FIG. 8. Videos on the news and documentaries have shown such incidents where a driver did not slow down sufficiently or remained in the emergency vehicle's lane resulting in them striking a police officer. At least some of these accidents could have been avoided using the present invention to warn approaching drivers at a distance to avoid emergency vehicles and personnel on the side of the road or the shoulder ahead. No driver wants to hit anyone with his or her vehicle and a simple but effective warning device such as the present invention would save lives and heartache for drivers and families of injured or dead victims.

DESCRIPTION OF THE RELATED ART

U.S. Pat. No. 5,097,397 by Stanuch et al. teaches a light bar with a plurality of domed light fixtures assembled in a nonlinear pattern (a V-shaped configuration) semi-permanently mounted on the roof by mechanical means attaching to the roof molding of an emergency vehicle. This configuration does not provide a directional aid other than when viewed from above instead of from the front or rear of the vehicle.

U.S. Pat. No. 7,561,036 B2 by Pederson for teaches a roof mounted light bar with LED light fixtures configured in various shapes semi-permanently mounted onto the roof by mechanical means attaching to the roof molding.

U.S. Pat. No. 6,081,191 by Green et al. teaches an elongated aerodynamic light bar mounted onto a roof having at least three layers of light fixtures, each powered separately and providing a high intensity warning light signal visible from 360 degrees around the light bar. Green does not teach any specific light configuration which would be used to direct approaching traffic as to which lane or lanes to avoid.

SUMMARY OF THE INVENTION

The present invention provides an emergency vehicle directional light unit comprising a base frame member, a first V-shaped lamp unit attached to a top surface of a left end of the base member and pointing to a left facing direction, a second V-shaped lamp unit attached to a top surface of a right end of the base member and pointing to a right facing direction. Both of the V-shaped lamp units contain a plurality of lamp assemblies which contain at least one lamp and which are evenly distributed over a rear surface of the V-shaped lamp units. The base frame member includes at least one attachment member permanently attached to a bottom or side surface of each end of the base frame member. Also included is a flasher unit switch control box with selector switch capable of selectively flashing on or off the left V-shaped lamp unit, the right V-shaped lamp unit, or both depending upon whether the police of emergency vehicle wishes to direct traffic to divert to the left side of the emergency vehicle, the right side, or both sides of the emergency vehicle.

Another preferred embodiment provides a vehicle directional light unit comprising a base frame member, at least three V-shaped lamp units pointing to a left facing direction and attached in a spaced apart relationship to one another to a top surface of a left end of the base member, at least three other V-shaped lamp units pointing to a right facing direction attached to a top surface of a right end of the base member. All of the V-shaped lamp units contain a plurality of lamp assemblies containing at least one bulb or LED and are evenly distributed over a rear surface of the V-shaped lamp units. The base frame member includes at least one attachment member attached to a bottom, front or side surface of the base frame member. Also included is a flasher unit switch control box capable of flashing the left at least three V-shaped lamp units or the right at least three V-shaped lamp units, where the left or right flashing is selected by a selector switch.

The present invention generally provides a vehicle directional light bar which can be mounted in the rear window of a vehicle by suction cups of the like, mounted to the rear deck, or mounted on the roof of a vehicle. The light bar is configured in such a way that individual lamps or groups of lamps form two arrows, one pointing to the left and the other pointing to the right. The user decides whether he wants the left or right arrows to flash, or both, and then selects a proper switch setting. Drivers in vehicles which are thousands of feet away see the selected lights flashing and then know which lane or lanes to avoid while approaching the site.

The lamps or groups of lamps may be configured in a simple V-shape pointing to the left or the right direction. Another embodiment has two or more V-shaped groups pointing the left or right for even higher visibility. A further embodiment includes V-shaped lamp groups which flash in succession to suggest motion of the arrows in the signal unit and thus reinforce the idea of indicating which lane or lanes an approaching vehicle should be using.

The vehicle directional light unit is especially useful on police vehicles and emergency vehicles such as an ambulance or fire truck. However, users of utility vehicles would benefit greatly from such a device, as well.

It is an object of this invention to provide vehicle directional lights which are used to indicate to approaching traffic the proper lane or lanes to use to avoid a blocked lane.

It is an object of this invention to provide vehicle directional lights comprising lamps or groups of lamps configured in V-shaped groupings pointing to the left or right.

It is an object of this invention to provide vehicle directional lights comprising lamps grouped into pluralities of V-shaped groupings pointing to the left or right.

It is an object of this invention to provide vehicle directional lights comprising lamps grouped into pluralities of V-shaped groupings pointing to the left or right wherein individual V-shaped groupings of lamps flash in succession towards the left or the right, thus more clearly indicating the preferred direction for traffic flow.

It is an object of this invention to provide vehicle directional lights comprising lamps grouped into pluralities of V-shaped groupings mounted on a common frame which is suitable for permanent mounting in the rear window of an emergency vehicle or utility vehicle.

It is an object of this invention to provide vehicle directional lights comprising lamps grouped into pluralities of V-shaped groupings mounted on a common frame which is suitable for temporary mounting on the roof of an emergency vehicle or utility vehicle, using suction cups, magnetic mounts, or the like.

It is an object of this invention to provide vehicle directional lights which comprising lamps grouped into pluralities of V-shaped groupings mounted on a common frame which is suitable for permanent mounting on the roof of an emergency vehicle or utility vehicle with fasteners such as screws, rivets or the like.

It is another object of the present invention to provide a selector switch capable of flashing a group of lights on and off together, or to flash a plurality of lighting elements including LED lights or bulbs individually from a select starting point to an end point in a sequence or series.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein:

FIG. 7 is a chart showing the Causes of Law Enforcement Deaths (1997-2006).

FIG. 8 is a chart showing the Causes of Law Enforcement Deaths (2000-2009).

DESCRIPTION OF THE PREFERRED EMBODIMENTS

Figure 1:
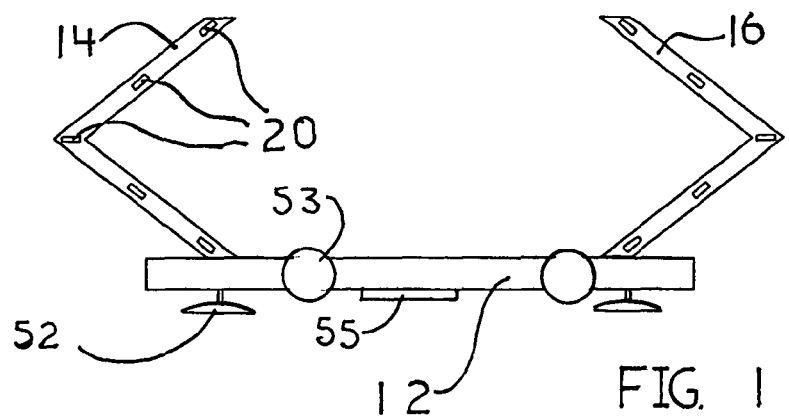
FIG. 1 is a front view of a vehicle directional light unit.
Figure 3:
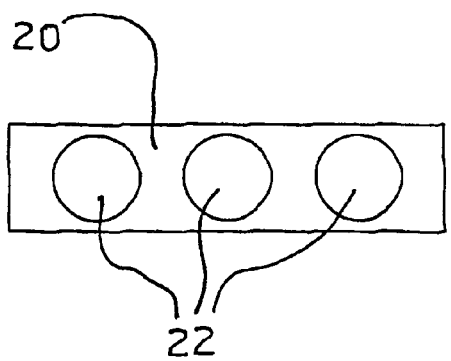
FIG. 3 is a top view of an individual lamp unit.
Figure 5:
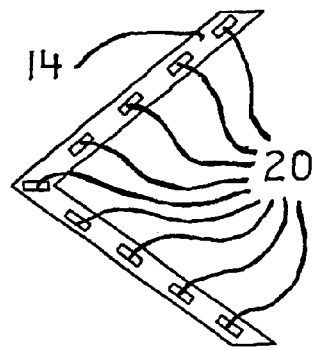
FIG. 5 is a front view of a V-shaped lamp unit including a higher number of lamp units.

In accordance with the present invention, there is provided a vehicle directional light unit to be used in a highly visible location on a police, emergency or utility vehicle to warn distant approaching drivers as to which lanes are preferable to use to avoid stopped traffic. FIG. 1 show a vehicle directional light unit 10 comprising a base frame member 12 with V-shaped lamp units 14 and 16. The unit may be held to a rear window by suction cups 53, or onto the rear deck by suction cups 52 or magnet 55. V-shaped lamp units 14 and 16 include five lamp assemblies 20. FIG. 5 shows a V-shaped lamp unit 14 with nine lamp units, each one having at least one bulb or LED. It is anticipated that almost any number of lamp assemblies 20 could be used on V-shaped units but the number should not go below five, as in FIG. 1. Lamp assemblies 20 may include 1 or more lamps 22. FIG. 3 shows a lamp unit 20 with three lamps 22. Lamps 22 may be incandescent, LED, neon, xenon, gas discharge, or any other lamp type which would be bright and operate in required weather and usage conditions. Further, lamps 22 are bright in color, for example amber, yellow, red, blue, orange, and green. Lamps 22 may be in combinations of selected colors as well.

Figure 2:
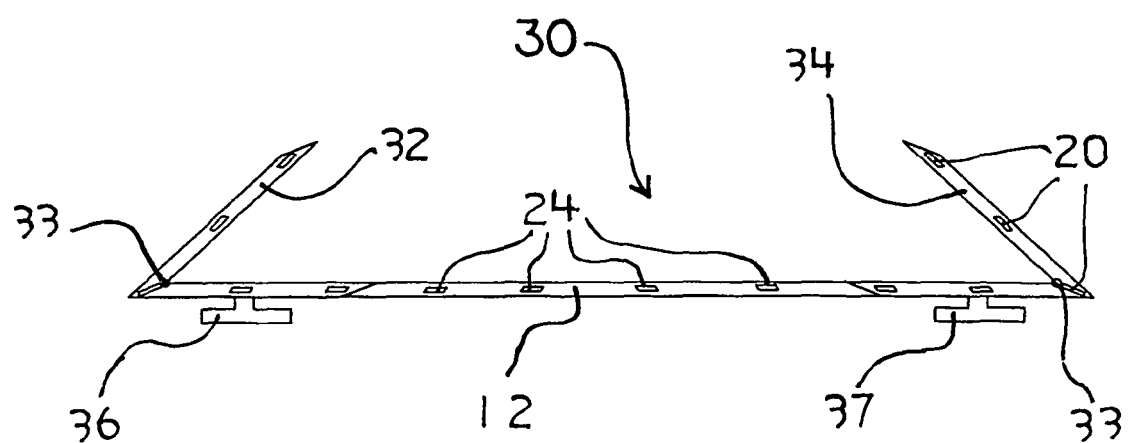
FIG. 2 is a front view of another embodiment of a vehicle directional light unit.

FIG. 2 shows another embodiment, vehicle directional light unit 30, which is simpler and less expensive to construct because the lamp units 32 and 34 are simply connected to the free ends of base unit 12. A further embodiment contains hinge members 33 where upon, lamp units 32 and 34 are rotated down to a space saving, storage position with units 32 and 34 parallel to base unit 12. Conversely, lamp units 32 and 34 are rotated up to an in-use position where they form arrows with base unit 12. Additionally, lamp assemblies 24 are caused to flash in succession along with lamp units 34 from left to right repeatedly or in succession with lamp unit 32 from right to left repeatedly, depending on the direction a user wishes to direct traffic flow.

Vehicle directional light unit 30 includes brackets 36 and 37 which are used along with screws, rivets or the like to permanently fasten light unit 30 to the shelf under a rear window of a police, emergency or utility vehicle or perhaps to the roof of such a vehicle. An alternate embodiment includes brackets 36 and 37 with non marring magnets for temporary attachment of the vehicle directional light unit to the roof or rear of the vehicle, rather than screws or rivets. Vehicle directional light unit 40 in FIG. 4, is provided with suction cups 42 for temporary attachment of the vehicle directional light unit to a roof ro rear of the vehicle.

Figure 4:
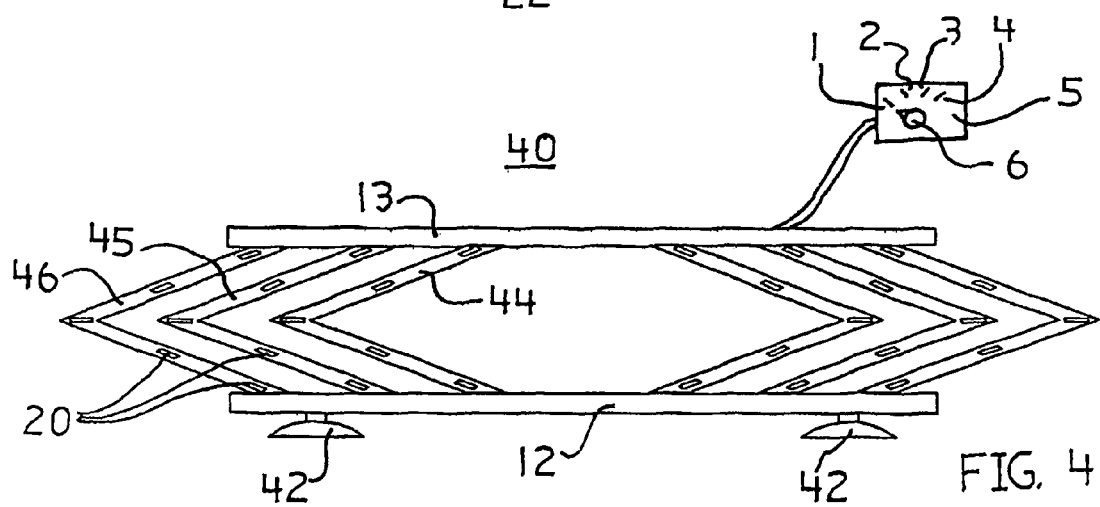
FIG. 4 is front view of a vehicle directional light unit with a plurality of V-shaped lamp units and a flasher switch control box.

Each embodiment of a vehicle directional light unit includes a flasher unit switch box 5 which is shown in FIG. 4. Flasher box 5 includes a rotary selector switch 6, with four positions, position 1, 2, 3 and 4. Position 1 is off. Position 2 is left lights flashing. Position 3 is right lights flashing. Finally, position 4 is all lights flashing. Required flasher units are contained along with control wiring within flasher box 5.

Still another embodiment vehicle directional light unit 40 is shown in FIG. 4. Vehicle directional light unit 40 includes three sets of V-shaped lamp units for the left direction and 3 sets for the right direction. Flasher unit control box 5 is capable of causing lamp unit 44 to come on for a second and then off, after which, lamp unit 45 comes on and then off, after which, lamp unit 46 comes on and then off, after which, lamp unit 44 come on and then off, and so on and so on, thus creating apparent motion of the left directional arrows and giving a more highly visible indication of which lanes to use to avoid a traffic stoppage. The converse would be true for the three right directional V-shaped lamp units.

Figure 6:
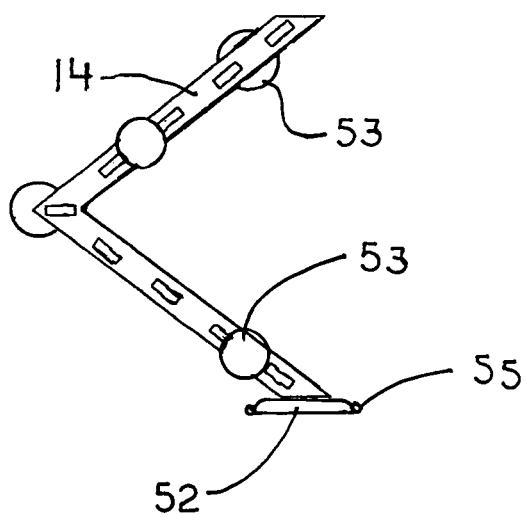
FIG. 6 is a front view of a reversible V-shaped directional light.

It is also anticipated that a reversible unit could comprise an arrow having a base supported by suction cups or a magnet and/or a frame containing opposing suction cups extending from each side of the frame could be utilized to provide the requisite emergency warning signals as shown in FIG. 6.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:

1. A vehicle directional light unit consisting of:
a horizontal base frame member including a plurality of LED lamp units permanently attached in a spaced apart relationship with one another and in electrical communication with one another, said base frame member including a first distal base member end and a second distal base member end;
a first longitudinal arm member hingedly attaching to a top surface of said first distal base member end projecting upwardly over said base frame member at a selected acute angle with respect to a top surface of said first distal end of said base frame member, said first longitudinal arm member and said first horizontal base member forming an outwardly pointing arrow, said first longitudinal arm member including a plurality of LED lamp units permanently attached in a spaced apart relationship to one another and in electrical communication with one another and said LED lamp units of said base frame member;
said first longitudinal arm member and said second longitudinal arm member folding inwardly aligned toward one another and resting on said top surface of said base frame member;
a second longitudinal arm member adjustably hingedly attaching to a top surface of said second distal base member end projecting upwardly over said base frame member at a selected acute angle with respect to a top surface of said second distal end of said base frame member, said second longitudinal arm member and said second horizontal base member forming an outwardly pointing arrow, said second longitudinal arm member including a plurality of LED lamp units permanently attached in a spaced apart relationship to one another and in electrical communication with one another and said LED lamp units of said base frame member and said LED lamp units of said first longitudinal arm member;
said base frame member including at least one attachment member permanently attached to a bottom surface of each end Of said base frame member;
a flasher unit switch control box selectively flashing a selected group of said LED lamps comprising at least one LED of said first longitudinal arm and at least one LED of said base frame member or comprising at least one LED of said second longitudinal arm and at least one LED of said base frame member on and off when a left or right flashing mode is selected by a selector means, said flasher unit switch control box flashing only the LEDs of the selected group, wherein each LED of said selected group is flashed one at a time or together in succession from right to left, left to right, over and over forming a flashing arrow;
said flasher unit flashing a plurality of LED lamps sequentially and in succession from left to right repeatedly or sequentially and in succession from right to left repeatedly, depending on the direction for directing traffic flow;
said LED lights are selected from the group consisting of alternating red LED lights and blue LED lights; and
said base frame member attaching to a vehicle interior adjacent to and visible through a rear window of said vehicle by attachment means.

2. The vehicle directional light unit of claim 1, wherein said base frame member mounts to a shelf under said rear window of a police, emergency or utility vehicle.

3. The vehicle directional light unit of claim 2, wherein said attachment means comprises at least one magnet removably fastening said base frame member to said shelf under said rear window of said police, emergency or utility vehicle.

4. The vehicle directional light unit of claim 1, wherein said LED lights comprise a flashing arrow with LED lights in alternating red and blue colors.

* * * * *